Patented Jan. 2, 1940

2,185,911

UNITED STATES PATENT OFFICE 2,185,911

DIRECT BATCH PROCESS FOR THE PRODUCTION OF IRON AND STEEL

Fritz Eulenstein, Cologne-on-the-Rhine, and Adolf Krus, Sturzelberg, Germany, assignors to Sachtleben Aktiengesellschaft für Bergbau und Chemische Industrie, Cologne-on-the-Rhine, Germany No Drawing. Application March 16, 1939, Serial No. 262,290. In Germany March 23, 1938

6 Claims. (Cl. 75—40)

This invention relates to a process for the production of iron and steel by the direct method and more particularly to a discontinuous or batch process for reducing iron ores directly with carbon in a moving furnace such as a rotary furnace.

In known processes for the direct production of iron and steel from oxidic iron containing materials such as iron ore, for instance that described in German Patent No. 651,163, a mixture of ore, carbon and lime is charged in batches into a rotary furnace and heated by direct flame and molten iron and slag are tapped from the furnace.

Operating this process in a drum furnace makes it necessary that the charge should fill only the smaller part of the furnace chamber, since otherwise, in consequence of the complete or partial rotary movement, ore would trickle out of the furnace. The furnace space is thus relatively poorly utilized. As the charge settles down in the course of the heating, further amounts of charge can be added to the furnace one or more times during the heating. In practice, however, nothing is gained by doing so, since the time required for treating the charge is then correspondingly lengthened so that no advantage is gained through the larger charge and the daily throughput capacity of the furnace is not increased.

It has now been found that by introducing into the furnace, at the beginning, only a (preferably pre-heated) mixture of ore and reducing carbon in such an amount that the useful furnace space is fully occupied and then after relatively short heating time, for example about 1 to 2 hours, when this mixture has contracted to such an extent that the lime required for the process can be added, adding the lime, the throughput capacity of the furnace can be materially increased. The lime is preferably added gradually, so that the required amount thereof is introduced into the furnace over a period of about ½ to 2 hours. The various additions can be distributed over the length of the rotary furnace by means of a suitable charging machine. A part of the lime may, if desired, also be introduced into the furnace at the same time as the mixture of ore and reducing carbon.

This method of introducing lime into the furnace has no disadvantages. The lime mixes well with the remainder of the charge and the operation of the furnace is not disturbed in any way. The time required for finishing the charge remains the same as when the complete charge is introduced at the beginning. An excellent desulphurization of the iron takes place even when starting materials having a high sulphur content are used, and it becomes possible considerably to increase the daily production of iron.

In addition to the whole or the major amount of the lime, a part of the reducing carbon also may be introduced into the furnace during the course of the heating operation. Even a little ore may also be so added in some cases, particularly when it is well pre-heated and free from volatilizable substances, such as zinc oxide.

The present invention thus enables the daily throughput capacity of the furnace to be increased by an amount of ore corresponding approximately with the entire addition of lime or with that and a part of the amount of reducing carbon. This advantage is considerable when, as is preferably the case, a large addition of lime is employed, amounting to about 20 to 60% of the ore.

Example I

A rotary tube furnace 11 metres in length and 3 metres in diameter was charged with a mixture consisting of 12.5 tons of sintered Meggen roasted pyrites and 4.3 tons of fine coke. The mixture was introduced into the reducing furnace in a pre-heated state, the pulverized coal burner of the furnace being operated with a flame that was neutral to weakly reducing. After heating for a period of about two hours, the addition of the lime was commenced. 4.4 tons of burnt lime in grain sizes below 30 mm. were added in all. The lime was added gradually over a period of about 2 hours. After a normal treating time of about 6 hours the reduction of the charge was complete, and by tilting the furnace the molten iron was first removed from the furnace and then the slag. An average of from 5.5 to 5.8 tons of high grade special iron having a carbon content of over 4% and a sulphur content below 0.01% was obtained per charge.

Example II

For the purpose of further increasing the throughput, a portion of the reducing medium also was only added during the course of the heating. The total consumption of reducing carbon, which was also employed in the form of fine coke amounted to 35% referred to the weight of the ore. 20% thereof was charged with the ore. The remaining 15% was added while adding the lime. Otherwise the addition of the lime and coke and the other operating conditions of the furnace were carried out as set forth in Example I. In consequence of the subsequent addition of a portion of the reducing carbon it was possible to increase the ore charge by about 2.5 tons, i. e., from 12.5 to 15 tons per charge. The yield of iron per charge accordingly was increased from about 5.5 to about 6.5 tons. The charge time and the quality of the iron produced were the same as in Example I.

We claim:

1. A batch process for the production of iron in a rotary drum furnace which comprises charging the furnace to its normal volume capacity with a mixture comprising more than a normal batch of ore, at least part of the reducing carbon required for the treatment of the ore, and less lime than is required for the treatment of the ore, heating the mixture by direct flame, after the charged mixture has contracted in volume introducing sufficient lime to complete the treatment of the ore and agitating the contents of the furnace by rotary movement of the furnace about a substantially horizontal axis.

2. Process as defined in claim 1 in which none of the lime required for the treatment of the ore is introduced with the ore and all of it is introduced subsequent to the introduction of the ore.

3. Process as defined in claim 1 in which a part only of the lime required for the treatment of the ore is introduced into the furnace with the ore.

4. Process as defined in claim 1 in which a part only of the reducing carbon required for the treatment of the ore is introduced with the ore and the remainder is introduced into the furnace after the initially charged mixture has contracted in volume.

5. Process as defined in claim 1 in which a mixture of ore with less than the proportion of reducing carbon required for the treatment of the ore and a part only or none of the lime required for the treatment of the ore is introduced into the furnace to its normal volume capacity and in which supplemental reducing carbon and supplemental or all of the lime required for the treatment of the ore are introduced into the furnace after the charge therein has contracted in volume.

6. A batch process for the reducing of iron ore in a drum furnace which comprises charging the furnace to substantially its normal volume capacity with a mixture of iron ore with less than a normal ratio of reducing carbon and not more than a part of a normal ratio of lime, heating the charge by a powdered coal flame, after about 1 hour introducing sufficient reducing carbon and sufficient lime to make up the normal ratios thereof to the ore charged and agitating the contents of the furnace by rotary movement of the furnace about a substantially horizontal axis.

FRITZ EULENSTEIN.
ADOLF KRUS.